(12) United States Patent
Schlegel et al.

(10) Patent No.: US 10,862,886 B2
(45) Date of Patent: Dec. 8, 2020

(54) SECURE MOBILE ACCESS FOR AUTOMATION SYSTEMS

(71) Applicant: ABB Schweiz AG, Baden (CH)

(72) Inventors: Roman Schlegel, Wettingen (CH); Sebastian Obermeier, Rietheim (CH)

(73) Assignee: ABB Schweiz AG, Baden (CH)

( * ) Notice: Subject to any disclaimer, the term of this patent is extended or adjusted under 35 U.S.C. 154(b) by 175 days.

(21) Appl. No.: 15/888,650

(22) Filed: Feb. 5, 2018

(65) Prior Publication Data

US 2018/0159854 A1 Jun. 7, 2018

Related U.S. Application Data

(63) Continuation of application No. PCT/EP2016/068432, filed on Aug. 2, 2016.

(30) Foreign Application Priority Data

Aug. 5, 2015 (EP) .................................... 15179763

(51) Int. Cl.
*H04W 48/02* (2009.01)
*H04W 12/08* (2009.01)
(Continued)

(52) U.S. Cl.
CPC ...... *H04L 63/0876* (2013.01); *G05B 19/0428* (2013.01); *G05B 19/41835* (2013.01);
(Continued)

(58) Field of Classification Search
None
See application file for complete search history.

(56) References Cited

U.S. PATENT DOCUMENTS 8,429,435 B1 * 4/2013 Clayton ................. G05B 11/01
713/320
8,625,796 B1 * 1/2014 Ben Ayed ........... H04L 63/0853
380/258

(Continued)

FOREIGN PATENT DOCUMENTS

| CN | 103905466 A | 7/2014 |
| CN | 103944883 A | 7/2014 |
| CN | 104272645 A | 1/2015 |

OTHER PUBLICATIONS

Facilitating a Secured Status Data Acquisition from Industrial Equipment via NFC. Lesjak et al. JITST. (Year: 2014).*

(Continued)

*Primary Examiner* — Venkat Perungavoor
(74) *Attorney, Agent, or Firm* — Taft Stettinius & Hollister LLP; J. Bruce Schelkopf

(57) ABSTRACT

An industrial automation and control system is provided with a control unit and at least one electronic device. The system establishes a first data connection to an external maintenance unit. The control unit is connected to the electronic device. The electronic device establishes a second data connection to the external maintenance unit and receives or retrieves a proximity information from the external maintenance unit through the second data connection. The electronic device sends the proximity information to the control unit. The control unit grants access to the electronic device by the external maintenance unit through the first data connection to perform maintenance of the electronic device if the proximity information indicates that the external maintenance unit is within a predetermined range from the electronic device.

17 Claims, 6 Drawing Sheets

(51) Int. Cl.
*H04L 29/06* (2006.01)
*G05B 19/042* (2006.01)
*G05B 19/418* (2006.01)
*H04W 64/00* (2009.01)

(52) U.S. Cl.
CPC ........ *H04L 63/083* (2013.01); *H04L 63/0823* (2013.01); *G05B 2219/32235* (2013.01)

(56) References Cited

U.S. PATENT DOCUMENTS

| | | | | |
|---|---|---|---|---|
| 9,154,951 | B2* | 10/2015 | Kubisch | ............... H04W 12/06 |
| 9,535,415 | B2 | 1/2017 | Keller et al. | |
| 2002/0042266 | A1* | 4/2002 | Heyward | ............... G08B 25/10 |
| | | | | 455/414.2 |
| 2007/0249319 | A1* | 10/2007 | Faulkner | ................. H04L 1/22 |
| | | | | 455/402 |
| 2011/0269456 | A1* | 11/2011 | Krishnaswamy | ....... H04W 8/26 |
| | | | | 455/426.1 |
| 2012/0178431 | A1* | 7/2012 | Gold | ................... H04M 1/7253 |
| | | | | 455/420 |
| 2013/0024542 | A1* | 1/2013 | Keller | ................ G05B 19/0428 |
| | | | | 709/217 |
| 2013/0086646 | A1 | 4/2013 | Poschmann et al. | |
| 2014/0051358 | A1* | 2/2014 | Dina | ..................... H04W 8/005 |
| | | | | 455/41.2 |
| 2014/0127994 | A1* | 5/2014 | Nightingale | .......... H04W 12/08 |
| | | | | 455/41.1 |
| 2014/0207281 | A1* | 7/2014 | Angle | ................... H04L 12/282 |
| | | | | 700/257 |
| 2014/0244768 | A1* | 8/2014 | Shuman | ................. H04L 51/32 |
| | | | | 709/206 |
| 2014/0270306 | A1* | 9/2014 | Luna | ......................... G01S 5/18 |
| | | | | 381/334 |
| 2014/0361872 | A1* | 12/2014 | Garcia | ................ H04B 5/0062 |
| | | | | 340/5.74 |
| 2015/0082404 | A1* | 3/2015 | Goldstein | ............. G06F 16/685 |
| | | | | 726/7 |
| 2015/0215321 | A1* | 7/2015 | Fries | .................. H04L 63/0807 |
| | | | | 726/4 |
| 2015/0280440 | A1* | 10/2015 | Wootton | ................ H05B 47/19 |
| | | | | 307/115 |
| 2015/0287318 | A1* | 10/2015 | Nair | ..................... G05B 19/418 |
| | | | | 340/5.52 |
| 2015/0309493 | A1* | 10/2015 | Patel | ..................... G05B 15/02 |
| | | | | 700/275 |
| 2015/0334515 | A1* | 11/2015 | Hiltgen | .................. H04W 4/80 |
| | | | | 455/41.1 |
| 2018/0117484 | A1* | 5/2018 | McCart-Pollak | ........ A63H 3/28 |

OTHER PUBLICATIONS

CN2591155. Xiao et al. (Year: 2003).*
European Patent Office, International Search Report & Written Opinion issued in corresponding Application No. PCT/EP2016/068432, dated Nov. 11, 2016, 10 pp.
European Patent Office, Extended Search Report issued in corresponding Application No. 15179763.6, dated Jan. 26, 2016, 8 pp.
Chinese Patent Office, Office Action issued in corresponding Chinese application No. 201680058219.4, dated Nov. 1, 2019, 5 pp.

* cited by examiner

SECURE MOBILE ACCESS FOR AUTOMATION SYSTEMS

FIELD OF THE INVENTION

The invention relates to the field of secure mobile access to an automation system, in particular to an industrial automation and control system, a method for mobile access to an industrial automation and control system and an apparatus for maintenance of at least one electronic device in an industrial automation and control system.

BACKGROUND OF THE INVENTION

Maintenance tasks within an automation system for different devices such as controllers, IEDs, etc. are typically conducted by personnel that connects to devices that need to be maintained. The connection to devices is done by either directly connecting to the device itself, or by connecting to the shop floor network or substation bus and then to the devices that are connected to it. Remote access for vendors is also possible using dial-up modems.

Current and future architectures for automation systems, including substation automation systems, also include the possibility for wireless access, which enables new applications, but also introduces new security risks.

For remote maintenance access, it is crucial that the access is legitimate and not part of an attack. Furthermore, when there are more and different possibilities to connect to a substation or an automation system, the risk of an attacker being able to exploit weaknesses may increase.

In a typical automation system, access to the network, e.g., the station bus in substations, shop floor network in general automation systems, will give an attacker almost unhindered access to all devices connected to the network. Likewise, simply plugging a cable into the front port of a device will typically give access to the device without any further security measures. In some cases, it is also possible to remotely access the network and the devices, e.g., through the internal wide-area network of the operator, through devices that have Internet connectivity, or through the corporate network.

US 2013/024542 A1 relates to systems, methods and software for operating a mobile device to control industrial automation equipment.

US 2013/086646 A1 relates to a method to safeguard the authorized access to a field device used in automation-technology.

DESCRIPTION OF THE INVENTION

It is therefore an object of the invention to restrict maintenance access to cases where maintenance is required and explicitly allowed. In particular, it is an objective of the invention to make sure that access is only granted if the maintenance personnel can be verified to be physically present in the substation or on the shop floor, and if the maintenance activity has been explicitly approved.

This objective is achieved by a system, a method and an apparatus according to the independent claims. Preferred embodiments are evident from the dependent patent claims.

The invention relates to an industrial automation and control system, IACS, comprising a control unit and at least one electronic device. The system is configured to establish a first data connection to an external maintenance unit and the control unit is connected to the at least one electronic device. The at least one electronic device is configured to establish a second data connection to the external maintenance unit and is configured to receive or retrieve a proximity information from the external maintenance unit through the second data connection. The at least one electronic device is further configured to send the proximity information to the control unit. The control unit is configured to grant access to the electronic device by the external maintenance unit through the first data connection for performing maintenance of the at least one electronic device if the proximity information indicates that the external maintenance unit is within a predetermined range from the at least one electronic device. The proximity can be deducted from the signal strength, signal interference of the connection or the propagation delay of the signal.

Preferably, the first and second data connection are packet-switched network connections such as Ethernet network connections. The step of grant access to the electric device by the external maintenance unit can be also understood as enabling a data communication between the external maintenance unit and the at least one electronic device.

Preferably, the at least one electronic device is an intelligent electronic device, IED. Preferably, the external maintenance unit is a laptop, a tablet, a PDA, a mobile communication unit, a smartphone or the like.

Preferably, the first data connection is at least one of the following: wide area network, local area network, wireless local area network, mobile cellular network system. Preferably, the mobile cellular network system comprises at least one of the following: GSM, GPRS, UMTS, LTE, WiMAX, WiMAX 2+.

Preferably, the system comprises a first data network interface configured to establish the first data connection to an external maintenance unit. For example, in case of wireless local area network being the first data connection, the first data network interface comprises a wireless local area network module.

Preferably, the second data connection is at least one of the following: near field communication NFC, barcode recognition, Bluetooth, ZigBee, IrDA.

Preferably, the system comprises a second data network interface configured to establish the second data connection to the external maintenance unit. For example, in case of NFC being the second data connection, the second data network interface comprises a NFC module. Preferably, the at least one electronic device comprises the second data network interface configured to establish the second data connection to the external maintenance unit.

Preferably, the predetermined range is between 0 cm and 5 m, more preferably between 0.1 cm and 100 cm, even more preferably between 4 cm and 50 cm.

In an advantageous embodiment of the invention, the at least one electronic device is configured to receive or retrieve at least one credential from the external maintenance unit through the second data connection and to send the at least one credential to the control unit, and the system is configured to establish the connection between the external maintenance unit and the at least one electronic device through the first data connection after the at least one electronic device has sent the at least one credential to the control unit and if the control unit verifies the at least one credential.

Preferably, the at least one credential comprises at least one of the following: identity information, certificate, password, token, single-use and/or time-limited token.

In an advantageous embodiment of the invention, the control unit is configured to determine whether the point in time the external maintenance unit is trying to perform maintenance matches with at least one maintenance schedule stored in the system and the system is configured to establish the connection between the external maintenance unit and the at least one electronic device through the first data connection if the point in time the external maintenance unit is trying to perform maintenance matches with the at least one maintenance schedule stored in the system. In other words, if the external maintenance unit is scheduled, the system is configured to establish the connection between the external maintenance unit and the at least one electronic device through the first data connection.

In an advantageous embodiment of the invention, the system comprises at least two electronic devices and the system is configured to establish the connection between the external maintenance unit and one electronic device through the first data connection isolated from the other electronic device. In other words, the system is configured to establish a connection between the external maintenance unit and one electronic device through the first data connection being completely isolated to another electronic device of the system.

In an advantageous embodiment of the invention, the at least one electronic device is configured to receive or retrieve a proximity information from the external maintenance unit through the second data connection by observing at least one of the following: signal strength, signal interference, or signal propagation delay.

In an advantageous embodiment of the invention, the proximity information comprises authentication information.

The present invention also relates to a method for mobile access to an industrial automation and control system, IACS. The method comprises the step of establishing a first data connection between the system and an external maintenance unit. The method further comprises the step of establishing a second data connection between the external maintenance unit and at least one electronic device of the system and receiving or retrieving a proximity information from the external maintenance unit through the second data connection indicating that the external maintenance unit is within a predetermined range from the at least one electronic device. The method further comprises the step of sending the proximity information from the at least one electronic device of the system to a control unit of the system. The method further comprises the step of granting access to the electronic device by the external maintenance unit through the first data connection for performing maintenance of the at least one electronic device if the proximity information indicates that the external maintenance unit is within a predetermined range from the at least one electronic device.

In an advantageous embodiment of the invention, the method comprises the steps of receiving or retrieving at least one credential from the external maintenance unit through the second data connection, sending the at least one credential to the control unit, verifying the at least one credential, and establishing the connection between the external maintenance unit and the at least one electronic device through the first data connection after the at least one electronic device has sent the at least one credential to the control unit and if the at least one credential is verified.

In an advantageous embodiment of the invention, the method comprises the steps of determining whether the point in time the external maintenance unit is trying to perform maintenance matches with the at least one stored maintenance schedule and establishing the connection between the external maintenance unit and the at least one electronic device through the first data connection if the point in time the external maintenance unit is trying to perform maintenance matches with the at least one maintenance schedule stored.

The invention also relates to an apparatus for maintenance of at least one electronic device in an industrial automation and control system. The apparatus comprises a first data network interface configured to establishing a first data network connection with the at least one electronic device. The apparatus also comprises a second data network interface configured to establishing a second data network connection to the industrial automation and control system. The apparatus is configured to provide and send proximity information to the control unit via the second data network connection. The apparatus is configured to perform the maintenance of the electronic device via the first data network connection, upon receiving an access approval by the control unit if the proximity information indicates that the apparatus is in a predetermined physical range from the at least one electronic device.

The invention also relates to an apparatus for maintenance of at least one electronic device in an industrial automation and control system comprising. The apparatus comprises a first data network interface configured to establishing a first data network connection with the at least one electronic device. The apparatus also comprises a second data network interface configured to establishing a second data network connection to the system. The apparatus is configured to allow the at least one electronic device to retrieve a proximity information and is configured to provide the proximity information to the control unit via the second data network connection. The apparatus is configured to perform the maintenance of the electronic device via the first data network connection, upon receiving an access approval by the control unit if the proximity information indicates that the apparatus is in a predetermined physical range from the at least one electronic device.

Preferably, the apparatus for maintenance is the external maintenance unit according to the preceding embodiments of the invention.

Preferably, the apparatus is configured to perform maintenance of at least one electronic device in an industrial automation and control system according to any of the preceding exemplary embodiments.

The invention also relates to a kit comprising a system according to any of the preceding embodiments and an apparatus according to any of the preceding embodiments.

The present invention also relates to a computer program product comprising one or more computer readable media having computer executable instructions for performing the steps of the method of one of the preceding embodiments.

The invention also relates to an industrial automation and control system, IACS, comprising a control unit and at least one electronic device. The system is configured to establish a first data connection to an external maintenance unit and the control unit is connected to the at least one electronic device. The at least one electronic device is configured to configured to receive a proximity information inputted by the maintenance staff in an input unit of the at least one electronic device. The at least one electronic device is further configured to send the proximity information to the control unit. The control unit is configured to grant access to the electronic device by the external maintenance unit through the first data connection for performing maintenance of the at least one electronic device if the proximity information indicates that the external maintenance unit is within a predetermined range from the at least one electronic device.

The invention also relates to a method for mobile access to an industrial automation and control system, IACS. The method comprises the step of establishing a first data connection between the system and an external maintenance unit. The method further comprises the step of receiving a proximity confirmation inputted by a maintenance staff in an input unit of the at least one electronic device of the system indicating that the external maintenance staff is within a predetermined range from the at least one electronic device of the system. The method further comprises the step of sending the proximity information from the at least one electronic device of the system to a control unit of the system. The method further comprises the step of granting access to the electronic device by the external maintenance unit through the first data connection for performing maintenance of the at least one electronic device if the proximity information indicates that the external maintenance unit is within a predetermined range from the at least one electronic device.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

Figure 1:
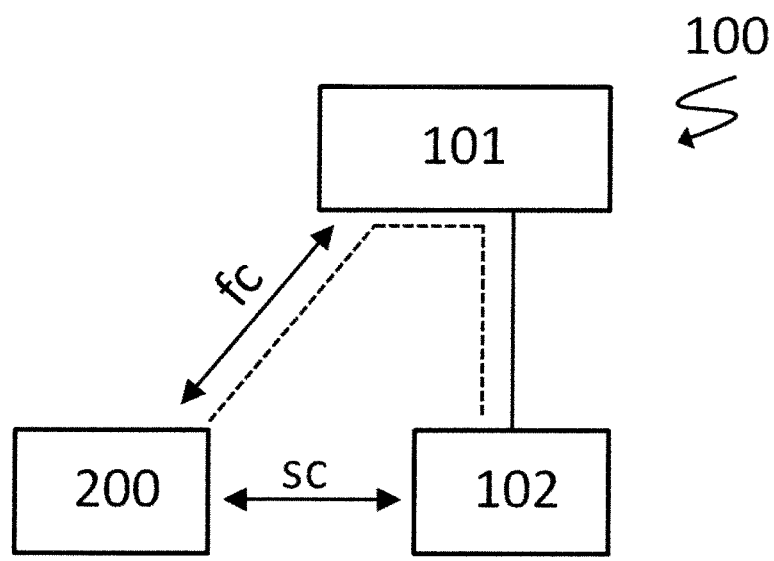
FIG. 1 schematically shows an industrial automation and control system and an external maintenance unit according to an embodiment of the invention.

FIG. 1 schematically shows an industrial automation and control system 100 and an external maintenance unit 200 according to an embodiment of the invention. The system 100 comprises a control unit 101 and an electronic device 102 which can be an intelligent electronic device, IED. The control unit 101 and the electronic device 102 are connected to each other.

The system 100 establishes a first data connection fc to the external maintenance unit 200. The establishment of the first data connection fc can be performed by the system 100, for example, if the external maintenance unit 200 tries to access the system 100. In addition to the first data connection fc, a second data connection sc to the external maintenance unit 200 is established by the electronic device 102. The electronic device 102 receives proximity information from the external maintenance unit 200. In addition to or as an alternative, the electronic device 102 retrieves said proximity information from the external maintenance unit 200. After receiving/retrieving said proximity information, the electronic device 102 sends the proximity information to the control unit 101.

If the proximity information received/retrieved by the electronic device 102 indicates that the external maintenance unit 200 is within a predetermined range from the at least one electronic device, the control unit 101 grants access to the electronic device 102 by the external maintenance unit 200 through the first data connection fc for performing maintenance of the electronic device 102. In this embodiment, the predetermined range is between 5 cm and 50 cm; however, it is understood by the skilled person, that the predetermined range can vary depending on the size of the electronic device 102 and/or the size of the system 100 and/or the space available in the facility where the electronic device 102 is located.

It is preferred that once the maintenance has been completed, the external maintenance unit 200 logs out of the electronic device 102 and any further access to the electronic device 102 needs again to be verified using the proximity information sent via the second data connection sc.

Figure 2:
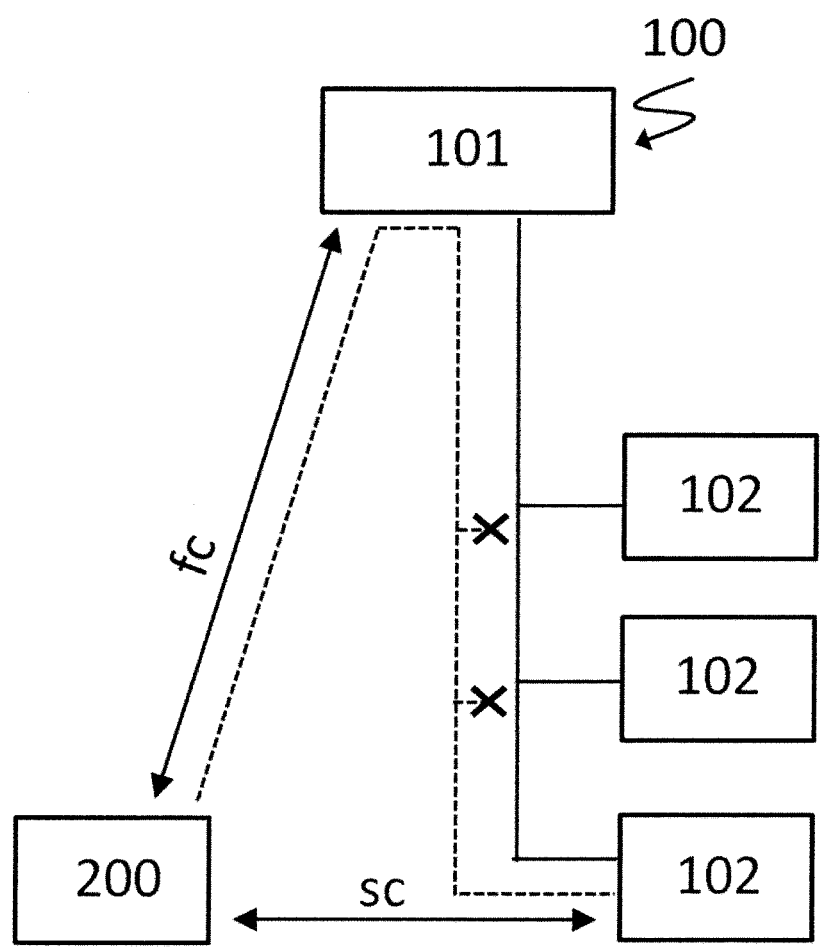
FIG. 2 schematically shows an industrial automation and control system and an external maintenance unit according to another embodiment of the invention.

FIG. 2 schematically shows an industrial automation and control system 100 and an external maintenance unit 200 according to another embodiment of the invention. This embodiment differs from the embodiment as shown in FIG. 1 in that the system 100 comprises a plurality of electronic devices 102. In this embodiment, the second data connection sc is only established between one electronic device 102 of the plurality of electronic devices 102 and the external maintenance unit 200. Therefore, the control unit 101 only grants access to the one electronic device 102 having the second data connection (sc) by the external maintenance unit 200 and denies access to the other electronic devices 102 not having a second data connection sc by the external maintenance unit 200. In other words, connections to any other electronic device 102 are blocked for the external maintenance unit 200.

Figure 3:
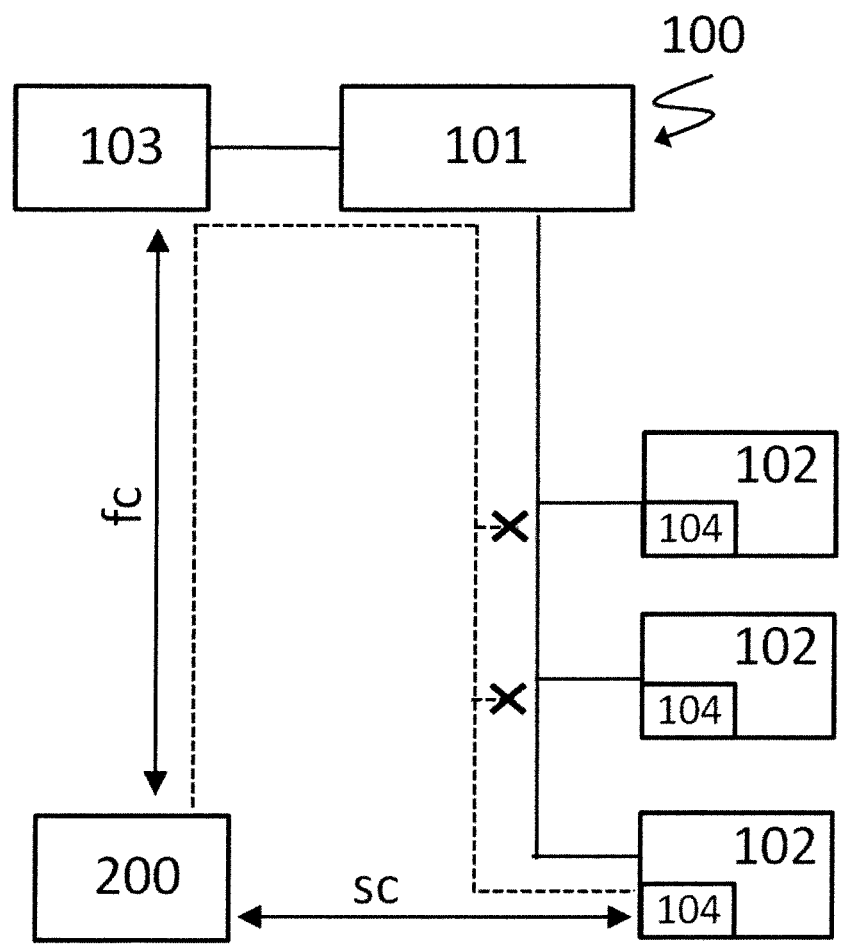
FIG. 3 schematically shows an industrial automation and control system and an external maintenance unit according to another embodiment of the invention.

FIG. 3 schematically shows an industrial automation and control system 100 and an external maintenance unit 200 according to another embodiment of the invention. In this embodiment, the system 100 further comprises a first data network interface 103 and the electronic devices 102 comprise a second data network interface 104 each. The first data connection fc is established between the first data network interface 103 and the external maintenance unit 200. The second data connection sc is established between the external maintenance unit 200 and the second data network interface 104 of one of the electronic devices 102. Also in this embodiment, the control unit 101 only grants access to the one electronic device 102 having the second data connection sc by the external maintenance unit 200 and denies access to the other electronic devices 102 not having a second data connection sc by the external maintenance unit 200.

Figure 4:
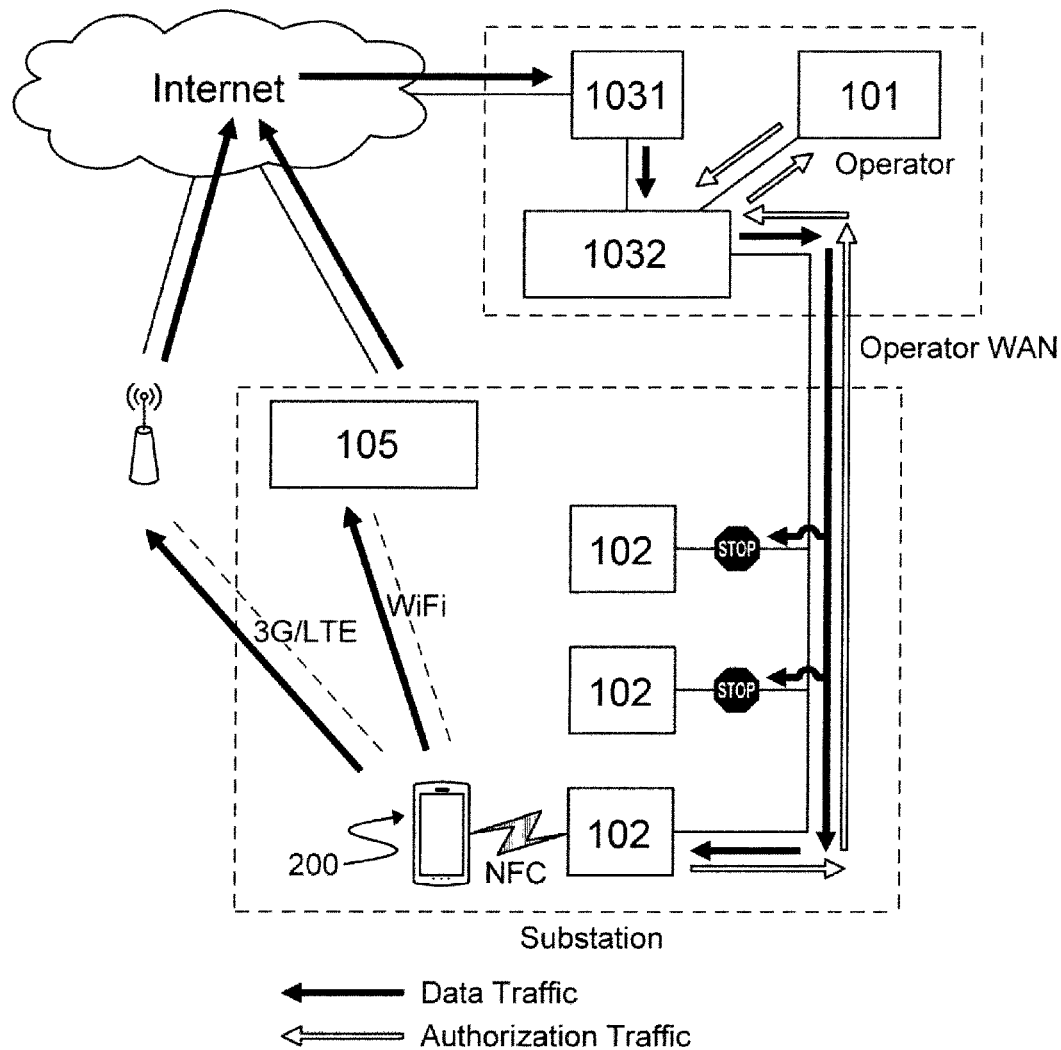
FIG. 4 schematically shows an industrial automation and control system and an external maintenance unit according to another embodiment of the invention.

FIG. 4 schematically shows an industrial automation and control system 100 and an external maintenance unit 200 according to another embodiment of the invention.

In this embodiment, the system 100 comprises a substation automation system, however, it is understood by the skilled person that the present invention is not limited to substation environments, but can also be applied to automation systems in general.

In this embodiment, the external maintenance unit 200 connects to the Internet either through a mobile phone connection, e.g. 3G/LTE, or a wireless access point 105 of the system 100. If a wireless access point is used, it is preferred that the external maintenance unit 200 requires certain credentials, e.g. certificate, a username/password or the like, to access the wireless access point 105.

In this embodiment, the first data network interface comprises as VPN server 1031 as well as a remote access server 1032. Through the Internet connection, the external maintenance unit 200 connects to the VPN server 1031. It is preferred, and that the external maintenance unit 200 again requires credentials to be able to connect to the VPN server 1031.

Through the VPN connection, the external maintenance unit 200 is able to access the remote access server 1032. In this embodiment, this is the first data connection fc. At this point, the remote access server 1032 does not yet allow access, but requires a proximity information indicating that the external maintenance unit 200 is located physically in front of the electronic device 102 to be maintained/that should be accessed to. In addition, it is preferred that it is also confirmed that the desired access is explicitly granted.

To prove physical proximity to the electronic device 102, the external maintenance unit 200 connects to the electronic device 102 using NFC as a second data connection sc. Using NFC as the second data connection sc, requires that the electronic device 102 and the external maintenance unit 200 are within a few centimetres of each other.

When the external maintenance unit 200 communicates with the electronic device 102 using NFC, it transmits proximity information and preferably transmits additional credentials, such as identity information as well as a certificate, password, or similar credential.

The electronic device 102 forwards the aforementioned information over a local network and/or a wide area network to the remote access server 1032. The remote access server 1032 sends the information to the control unit 101 where it is verified whether the maintenance access has been scheduled before hand and whether the external maintenance unit 200 is the unit scheduled to perform the maintenance.

If access has been successfully verified, the control unit 101 grants access by the external maintenance unit 200 to the selected electronic device 102. Only communication with the selected electronic device 102 is allowed for the external maintenance unit 200, connections to any other electronic devices 102 are blocked for the external maintenance unit 200.

Once the maintenance has been completed, the external maintenance unit 200 logs out of the electronic device 102 and any further access to the electronic device 102 needs again to be verified using the proximity information sent via the second data connection sc.

Figure 5:
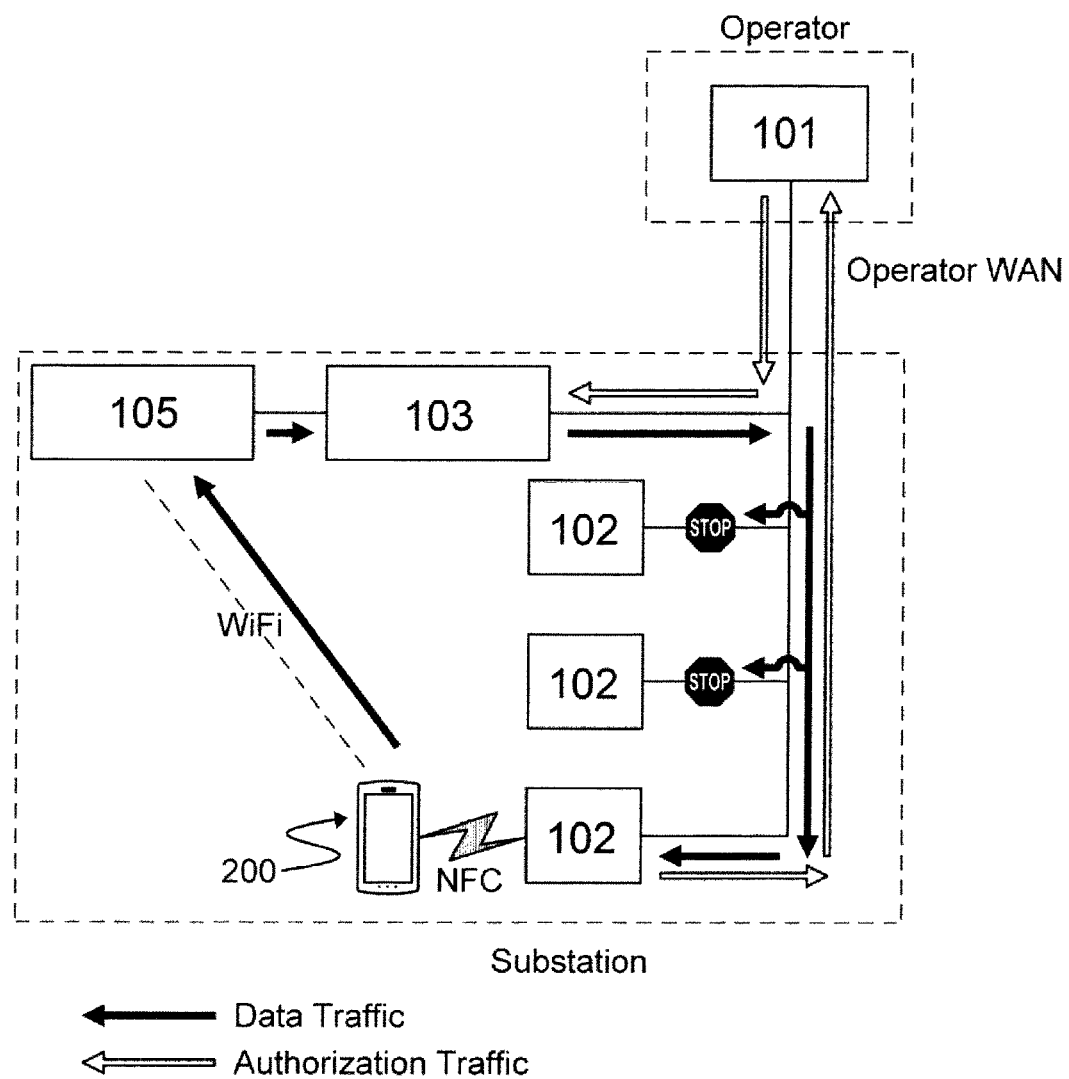
FIG. 5 schematically shows an industrial automation and control system and an external maintenance unit according to another embodiment of the invention.

FIG. 5 schematically shows an industrial automation and control system 100 and an external maintenance unit 200 according to another embodiment of the invention.

In this embodiment, any external network connection of the system is bandwidth-constraint and does not easily allow remote access to devices in the system. For example, the external connection to a substation could be provided by a low-bandwidth radio link.

In this embodiment, the external maintenance unit 200 connects to a local WLAN access point 105 within the substation. The local WLAN access point 105 is connected to a first data network interface 103 which comprises a firewall which by default blocks all access. In this embodiment, the connection to the WLAN access point is the first data connection sc.

Like in the embodiment shown in FIG. 4, to prove physical proximity to the electronic device 102, the external maintenance unit 200 connects to the electronic device 102 using NFC as a second data connection sc.

The electronic device 102 forwards the aforementioned information over a local network and/or a wide area network to the control unit 101. The information transmitted is very small i.e., only the information required to authenticate the access, and can be transmitted over bandwidth-constrained links. The control unit 101 verifies whether the maintenance access has been scheduled before hand and whether the external maintenance unit 200 is the unit scheduled to perform the maintenance. In addition, it is preferred that the control unit 101 also verifies any credentials sent by the external maintenance unit 102 to the electronic device 102.

If access has been successfully verified, the control unit 101 sends a message to the first data network interface 103 to grant access by the external maintenance unit 200 to the selected electronic device 102. Only communication with the selected electronic device 102 is allowed for the external maintenance unit 200, connections to any other electronic devices 102 are blocked for the external maintenance unit 200.

In this embodiment, it is also preferred, that the NFC connection has to be established first, and only if the credentials that are passed have been verified successfully, the WLAN access, i.e. the first data connection fc, is enabled.

Figure 6:
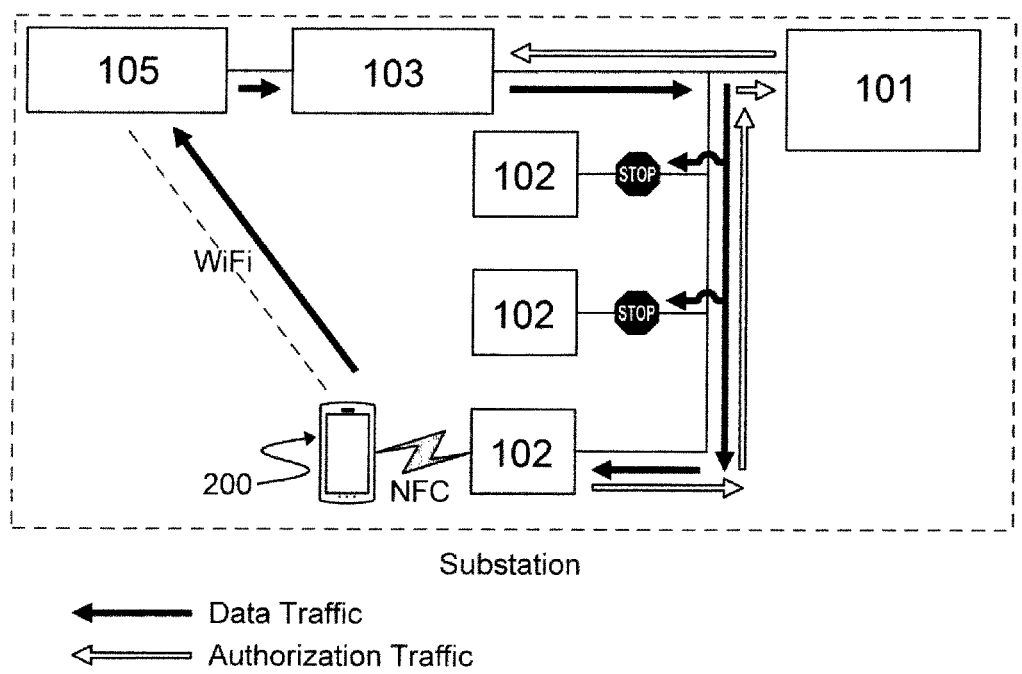
FIG. 6 schematically shows an industrial automation and control system and an external maintenance unit according to another embodiment of the invention.

FIG. 6 schematically shows an industrial automation and control system 100 and an external maintenance unit 200 according to another embodiment of the invention.

In this embodiment, the system 100 has no external network connection at all.

Like in the embodiment shown in FIG. 5, the external maintenance unit 200 connects to a local WLAN access point 105 within the substation. The local WLAN access point 105 is connected to a first data network interface 103 which comprises a firewall which by default blocks all access. In this embodiment, the connection to the WLAN access point is the first data connection fc.

Like in the embodiments shown in FIGS. 4 and 5, to prove physical proximity to the electronic device 102, the external maintenance unit 200 connects to the electronic device 102 using NFC as a second data connection sc.

The electronic device 102 forwards the aforementioned information over a local connection to the control unit 101. In this embodiment, the control unit 101 acts as a local authentication component and the proximity information and the credentials—if any—are verified. In this embodiment, it is preferably not verified whether actual maintenance has been scheduled. If the control unit 101 successfully verifies the proximity information and the credentials, the control unit 101 directs the first data network interface 103 to allow access to the selected electronic device 102. As in the previous embodiments, connections to any other electronic device 102 are blocked.

Once the maintenance has been completed, the firewall of the first data network device 103 again blocks all access.

Also in this embodiment, it is preferred, that the NFC connection has to be established first, and only if the credentials that are passed have been verified successfully, the WLAN access, i.e. the first data connection fc, is enabled.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF DESIGNATIONS

100 Industrial automation and control system—IACS
101 Control unit
102 Electronic device
103 First data network interface
1031 VPN Server
1032 Remote Access Server
104 Second data network interface
105 WLAN Access Point
200 External maintenance unit/apparatus
201 First data network interface
202 Second data network interface

The invention claimed is:

1. An industrial automation and control system, IACS, comprising:
   a control unit and a plurality of intelligent electronic devices (IEDs),
   wherein the system is configured to establish a first data connection to an external maintenance unit,
   wherein a firewall limits access through the first data connection,
   wherein the control unit is connected to the plurality of IEDs,
   wherein only one of the plurality of IEDs establishes a second data connection to the external maintenance unit and receives or retrieves a proximity information from the external maintenance unit through the second data connection,
   wherein the IED having the second data connection established is further configured to send the proximity information to the control unit over a bandwidth-constrained link, and
   wherein the control unit is configured to only grant access to the IED having the second data connection established by the external maintenance unit through the first data connection for performing maintenance of the one of the plurality of IEDs if the proximity information indicates that the external maintenance unit is within a predetermined range from the one of the plurality of IEDs and the control unit is configured to block any connections between the external maintenance unit and any of the plurality of IEDs other than the one IED having the second data connection established,
   wherein the control unit is configured to determine whether the point in time the external maintenance unit is trying to perform maintenance matches with at least one maintenance schedule stored in the system, and
   wherein the system is configured to establish the connection between the external maintenance unit and the IED having the second data connection established through the first data connection if the point in time the external maintenance unit is trying to perform maintenance matches with the at least one maintenance schedule stored in the system.

2. The system according to claim 1,
   wherein the IED having the second data connection established is configured to receive or retrieve at least one credential from the external maintenance unit through the second data connection and to send the at least one credential to the control unit, and
   wherein the control unit is configured to grant access to the IED having the second data connection established by the external maintenance unit through the first data connection after the IED having the second data connection established has sent the at least one credential to the control unit and if the control unit verifies the at least one credential.

3. The system according to claim 2,
   wherein the at least one credential comprises at least one of the following: identity information, certificate, password, token, single-use and/or time-limited token.

4. The system according to claim 1,
   wherein the first data connection is at least one of the following: a wide area network, in particular the internet, a local area network, a wireless local area network, a mobile cellular network system; and/or
   wherein the second data connection is at least one of the following: near field communication NFC, Bluetooth, infrared communication, bar code recognition.

5. The system according to claim 1,
   wherein the IED having the second data connection established is configured to receive or retrieve a proximity information from the external maintenance unit through the second data connection by observing at least one of the following: signal strength, signal interference, or signal propagation delay.

6. The system according to claim 1,
   wherein the proximity information comprises authentication information.

7. The system according to claim 2,
   wherein the first data connection is at least one of the following: a wide area network, in particular the internet, a local area network, a wireless local area network, a mobile cellular network system; and/or
   wherein the second data connection is at least one of the following: near field communication NFC, Bluetooth, infrared communication, bar code recognition.

8. The system according to claim 2,
   wherein the IED having the second data connection established is configured to receive or retrieve a proximity information from the external maintenance unit through the second data connection by observing at least one of the following: signal strength, signal interference, or signal propagation delay.

9. The system according to claim 2,
   wherein the proximity information comprises authentication information.

10. The system according to claim 1, wherein the first data connection is at least one of the following: a wide area network, in particular the internet, a local area network, a wireless local area network, a mobile cellular network system; and/or wherein the second data connection is at least one of the following: near field communication NFC, Bluetooth, infrared communication, bar code recognition.

11. The system according to claim 4,
    wherein the IED having the second data connection established is configured to receive or retrieve a proximity information from the external maintenance unit through the second data connection by observing at least one of the following: signal strength, signal interference, or signal propagation delay.

12. A method for mobile access to an industrial automation and control system, IACS, comprising the steps of:
connecting a control unit of the system to a plurality of intelligent electronic devices (IEDs);
establishing a first data connection between the system and an external maintenance unit;
limiting access through the first data connection with a firewall,
establishing a second data connection between the external maintenance unit and only one of the plurality of IEDs of the system and receiving or retrieving a proximity information from the external maintenance unit through the second data connection indicating that the external maintenance unit is within a predetermined range from the IED having the second data connection established;
sending the proximity information from the IED having the second data connection established to the control unit over a bandwidth-constrained link;
granting access to only the IED having the second data connection established by the external maintenance unit through the first data connection for performing maintenance of the one of the plurality of IEDs if the proximity information indicates that the external maintenance unit is within a predetermined range from the one of the plurality of IEDs and the control unit is configured to block any connections between the external maintenance unit and any of the plurality of IEDs other than the one IED having the second data connection established;
determining whether the point in time the external maintenance unit is trying to perform maintenance matches with the at least one maintenance schedule stored; and
establishing the connection between the external maintenance unit and the IED having the second data connection established through the first data connection if the point in time the external maintenance unit is trying to perform maintenance matches with the at least one maintenance schedule stored.

13. The method according to claim 12, further comprising the steps of:
receiving or retrieving at least one credential from the external maintenance unit through the second data connection;
sending the at least one credential to the control unit;
verifying the at least one credential; and
establishing the connection between the external maintenance unit and the IED having the second data connection established through the first data connection after the IED having the second data connection established has sent the at least one credential to the control unit and if the at least one credential is verified.

14. The method of claim 12, wherein the first data connection is at least one of the following: a wide area network, in particular the internet, a local area network, a wireless local area network, a mobile cellular network system; and/or wherein the second data connection is at least one of the following: near field communication NFC, Bluetooth, infrared communication, bar code recognition.

15. The method of claim 14,
wherein the IED having the second data connection established is configured to receive or retrieve a proximity information from the external maintenance unit through the second data connection by observing at least one of the following: signal strength, signal interference, or signal propagation delay.

16. The method of claim 15,
wherein the proximity information comprises authentication information.

17. The method of claim 16,
wherein the at least one credential comprises at least one of the following: identity information, certificate, password, token, single-use and/or time-limited token.

* * * * *